United States Patent Office.

THOMAS HEAP, OF ST. JOSEPH, MISSOURI.

Letters Patent No. 98,373, dated December 28, 1869.

IMPROVEMENT IN CONCRETE BLOCKS FOR BUILDING AND OTHER PURPOSES.

The Schedule referred to in these Letters Patent and making part of the same.

To all whom it may concern:

Be it known that I, THOMAS HEAP, of the city of St. Joseph, in the county of Buchanan, and State of Missouri, have invented a new and improved Mode of Manufacturing a Certain Species of Building-Material of Concrete, to be used in the construction of buildings, pavements, roofs, and for every other use or purpose for which stone, brick, or concrete, is used; and I do hereby declare the following to be a full and exact description thereof.

Said concrete is composed of the following materials, compounded in the manner hereinafter stated:

I. Sand, or, in lieu thereof, gravel, pounded stone, or marble-dust, eighty (80) parts.

II. A mixture, consisting of sixty-six and two-thirds parts of coal-tar, and thirty-three and one-third of pitch; or, in lieu thereof, a mixture, consisting of seventy-five parts of tar, and twenty-five parts of rosin, ten (10) parts.

III. A mixture, consisting of equal parts of hydraulic cement and dry-slaked lime, ten parts.

These three component parts, mixed, and boiled to the consistency of common mortar, form the concrete, which is then capable of being moulded into the desired form, and, when cooled and exposed to the air, becomes hard and solid.

To improve the appearance of the solid concrete thus formed, I apply the following mixture, in the following manner:

I. Linseed-oil, twenty-five parts.
II. Sand, twenty-five parts.
III. White lead, fifty parts.

This mixture, I apply to the desired surface of the concrete with a common trowel, putting on just sufficient to give it a face.

The face thus produced becomes capable of a high state of polish.

The addition of whatever coloring-matter desired, to the mixture last mentioned, can be used to impart that color to the concrete.

What I claim as my invention, is—

1. A concrete building-block, formed of the materials, and compounded in about the proportions herein specified.

2. A concrete building-block, faced with the composition herein described, substantially in the manner specified.

THOMAS HEAP.

Witnesses:
 WINSLOW JUDSON,
 JAMES A. MATNEY.